United States Patent
Pajarre et al.

[19]

[11] Patent Number: 6,161,120
[45] Date of Patent: Dec. 12, 2000

[54] APPARATUS FOR PERFORMING A DIVISION OPERATION, ESPECIALLY FOR THREE-DIMENSIONAL GRAPHICS

[75] Inventors: Eero Pajarre; Mika Hoffren, both of Tampere, Finland

[73] Assignee: VLSI Solution Oy, Tampere, Finland

[21] Appl. No.: 09/110,846

[22] Filed: Jul. 7, 1998

[30] Foreign Application Priority Data

Jul. 7, 1997 [FI] Finland ................................. 972885

[51] Int. Cl.$^7$ ....................................................... G06F 7/52

[52] U.S. Cl. ............................................................ 708/650

[58] Field of Search ............................ 708/650, 653–656

[56] References Cited

U.S. PATENT DOCUMENTS 5,020,017  5/1991  Ooms et al. ............................ 708/650

*Primary Examiner*—Tan V. Mai
*Attorney, Agent, or Firm*—Pillsbury Madison & Sutro LLP

[57] ABSTRACT

The present invention relates to arithmetical computing devices, and especially to a division operation in three-dimensional (3D) graphics. A division f(a,b)=a/b is calculated by an integrated division circuit. In order to decrease the chip area and calculation time needed, the bit width of the divider and the dividend is reduced by preprocessing. Firstly, the scaling factor is searched in basis of the divider. Then both the divider and divident are scaled by the single scaling factor. Division is then done with these shrunk bit vectors.

14 Claims, 4 Drawing Sheets

APPARATUS FOR PERFORMING A DIVISION OPERATION, ESPECIALLY FOR THREE-DIMENSIONAL GRAPHICS

FIELD OF THE INVENTION

The present invention relates to arithmetical computing devices, and especially to a division operation in three-dimensional (3D) graphics.

BACKGROUND OF THE INVENTION

One increasingly important application area for data processing units which are implemented as integrated circuits is three dimensional (3D) graphics. In 3D graphics objects to be displayed are divided into smaller fragments like polygons which are composed of pixels. Each pixel contains information of its colour and location as well as the value of the third dimension. Each pixel may also have other components, such as coordinates for its surface information and transparency Normally, all components of the pixel are first interpolated in the two-dimensional (2D) space. The linear interpolation, however, will cause distortion in case of perspective projection. We can obtain an approximate solution to this problem by decomposing polygons into smaller ones, or an exact solution, at greater cost, by performing perspective correction for the 2D values so as to take account the third dimension. The perspective correction is done by a division operation in which each pixel's flat 2D information is divided by pixel's perspective information which is same for all data components of the pixel. If the perspective correction is not carried out, different kinds of annoying artefacts will become visible.

Due to the high speed requirements, the division is normally implemented by integrated division circuits. However, in case a dedicated division unit and full bit width are employed for each component of the pixel, a huge amount of chip area and latency is required. Usually this leads in compromises, such as a partial perspective correction in which only few of pixel information components are corrected. In 3D graphics the pixel values (colours, texture, etc) are in the range of 6 to 12 bits when the interpolation is done with 32 or more bits.

Therefore, there is need to decrease the amount of the chip area and time needed for the perspective correction. To this end, there exists several algorithms to calculate the division $f(a,b)=a/b$. Both the dividend a and the divider b are scaled separately so that meaningless bits (zeros) are taken away starting from the most significant bits. The division itself is then done with these shrunk bit vectors. Upon division, the scaling information of the divider and the dividend have to be combined to compose the final result of the division.

A SHORT SUMMARY OF THE INVENTION

An object of the present invention is a new division circuit overcoming the above described shortcomings and problems.

In the invention a divider and a dividend are preprocessed in order to reduce bit widths needed in the division process while still keeping the accuracy of the division result acceptable. The invention is based on a fact that, especially in the perspective division in the 3D graphics, the bit width N of the division result is lower than the bit widths K and L of the divider and the dividend, respectively. Consequently, for N-bit division result, the bit width of the divider can be reduced to be N bits and, based on the information on the divider bit width reduction, 2N bits can be selected from the dividend for the division having an error smaller than 1. Thereby, due to reduced bit width of the divider and the dividend, the chip area required by the actual division operation is significantly reduced in comparison with the prior art division units, while still keeping the accuracy acceptable.

An essential feature of the invention is that the divider and the dividend are scaled by a same factor. In the preferred embodiment of the invention, a N-bit divider is first derived from a K-bit raw value of the divider by searching, starting from the most significant bit (MSB) towards the least significant bit (LSB), a first active MSB bit (Rth bit from the MSB of the raw divider). Normally the bit is considered to be active in a logical state one (nonzero state) and inactive in a logical state zero, or vice versa. When the active bit is detected in the raw divider, the detected bit and N−1 subsequent LSB bits are selected to provide a scaled divider. In case that the active bit is not found before Nth LSB bit, the remaining N last bits are selected as a scaled divider. The scaled divider is applied to a division unit. The information on the bit location of the first active bit also provided for subsequent scaling of the raw dividend.

The L-bit raw dividend is extended to have a bit width of L+N bits by adding N inactive (e.g. zero) bits to the MSB side of the raw dividend. Then the Rth bit from MSB and the 2N−1 subsequent LSB bits of the extended dividend are selected to provide a 2N bit scaled dividend, according to the scaling information obtained from the divider scaling. The scaled dividend is also applied to the division unit.

In an embodiment of the invention the bits of the extended dividend from L+N to the Rth bit are examined in order to find a possible saturation. In other words, it is checked whether there is an active bit or active bits before the Rth bit from the MSB of the extended dividend. If a more significant active bit is detected, the dividend will be saturated to a maximum value, i.e. each bit is set active. This minimizes the error in the saturation situation. Saturation checking is not required when the raw dividend and the raw divider are well defined so that no saturation will occur.

BRIEF DESCRIPTION OF THE DRAWINGS

The preferred embodiments of the invention will be described in the following with reference to the attached drawings in which.

THE PREFERRED EMBODIMENTS OF THE INVENTION

The present invention is applicable in any arithmetical computing device for performing an arithmetical division operation. The present invention is especially suitable for three-dimensional graphics, particularly for perspective correction of various information components of a pixel.

Figure 1:
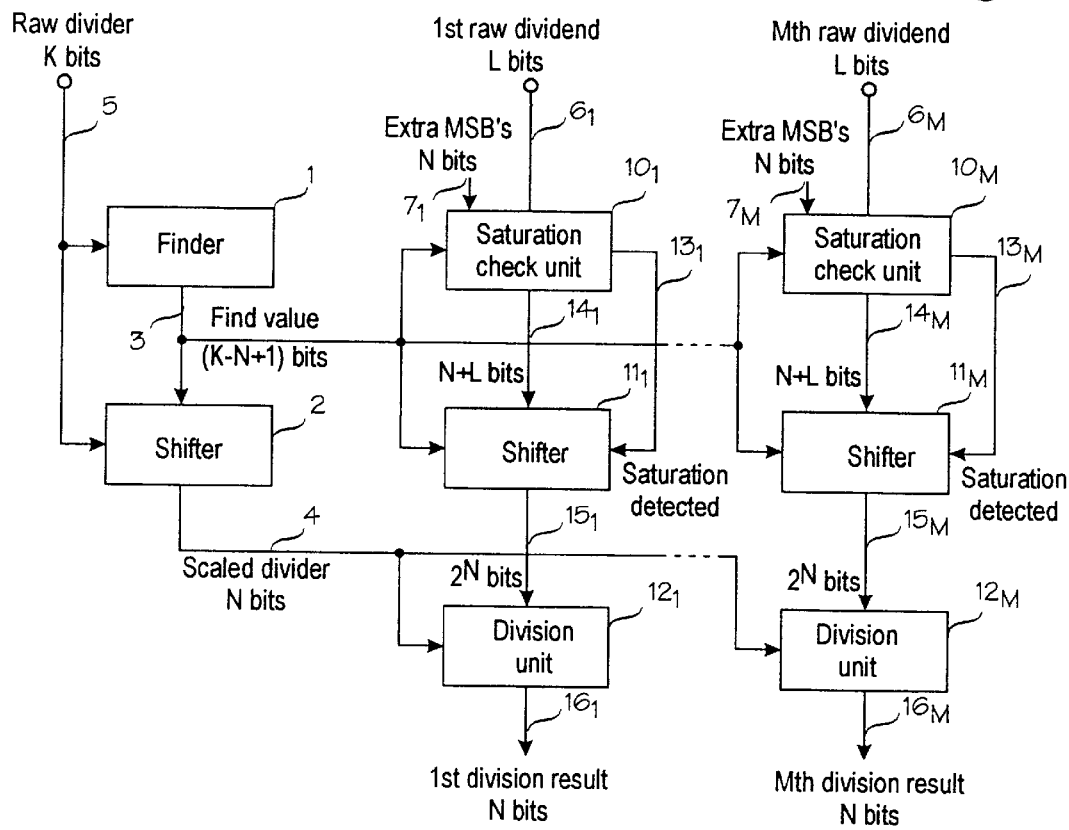
FIG. 1 shows a block diagram of the division device according to the present invention.

A basic block diagram of the division device according to the preferred embodiment of the invention is shown in FIG. 1. The division device is constructed to perform several (M, wherein M=1,2,3, . . . ) arithmetical division operations each having a dedicated dividend. There is, however, a single common divider for each division operation.

In FIG. 1, the actual division operation is carried out in the respective division unit $12_1$ . . . $12_M$. In the integrated division circuits the chip area required for implementation of the division operation is highly dependent on the bit width required in the actual division unit. The present invention is focused on preprocessing the divider and the dividend to reduce the bit width needed in the actual division unit while still keeping the accuracy of the division result acceptable.

In the illustrated embodiment it is assumed that the bit width of the original (raw) divider and the original (raw) dividend are K bits and L bits, respectively. Bit width of the division result is N bits, N, K and L being positive integers, and N<K and N<L.

The K-bit raw divider at the input 5 is applied to a finder unit 1 and a shifter unit 2. The finder unit 1 searches for the first active most significant bit (MSB) in the raw divider, and outputs at the output 3, a find value which indicates the bit location of the first active MSB found. In FIG. 1 the find value is a (K−N+1)-bit binary value in which each bit represent the respective MSB bit location in the raw divider. The bit representing the bit location of a first active MSB found is set active, and the remaining bits are set inactive in the found value. In the embodiment illustrated a bit is considered to be active in a logic state one (non-zero state) and inactive in a logic state zero. However, also an inverted logic may be used.

Figure 2A:
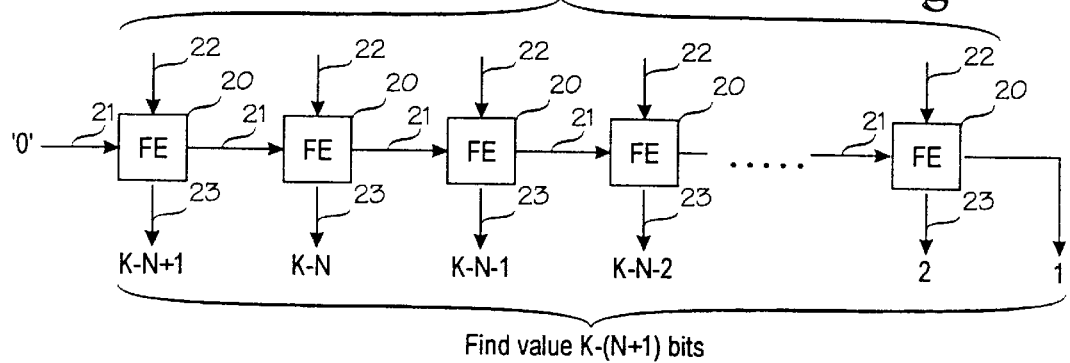
FIG. 2A shows a block diagram of the finder unit in FIG. 1.
Figure 2B:
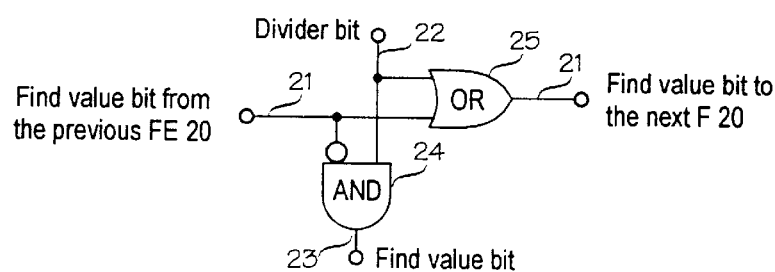
FIG. 2B shows a circuit diagram of a cell in the finder unit of FIG. 2A.

The structure and operation of the finder unit 1 will be described more detailly with reference to FIGS. 2A and 2B. The finder unit 1 consists of cascade connection of finder units FE20, the total number of finder units being (K−N+1). Each FE20 checks one MSB bit of the raw divider and provides the respective find value bit. The structure of the FE20 is shown in FIG. 2B. The divider bit to be examined and prevailing at input 22 is applied to AND gate 24 and OR gate 25. The find value bit from the previous FE is received at the input 21 and applied to an inverted input of the AND gate 24 and to the input of OR gate 25. Found value bit at the output of the current FE is set to one if the find value bit from the previous FE20 is zero and the divider bit to be examined is active (one). If the previous find value bit is one or the divider bit is inactive, the current find value bit is set zero at the output 23. The output 21 of OR gate 25 is set one if the divider bit and/or the find value bit from the previous FE20 is one. In the first FE20 in the cascade the "previous find value" input is set zero, as shown in FIG. 2A. As a consequence, the finder unit 1 provides a binary "bit map" value in which a bit corresponding to the first active MSB found is one and the remaining bits are zeros.

Referring again to FIG. 1, the find value generated by the finder unit 1 is applied to shifter units 2 and $11_1$ . . . $11_M$ and saturation check units $10_1$ . . . $10_M$ for controlling the scaling of divider and dividends. In other words, the same scaling factor is employed for the divider and each of the dividends.

Firstly, the structure and operation of the shifter unit 2 will be described with reference to FIG. 3. In a conventional manner, the shifter unit 2 consists of an array of shifting cells 30. The size of the array depends on the bit widths required, in the FIG. 3 a 4×6 array is shown. Each cell 30 is provided with a data input for receiving the raw divider bit, a control input for receiving a find value bit, and a data output. The cell 30 transfers the data input to the data output if the control input is active. Each find value bit controls one column in the array. With the configuration shown in FIG. 3, if the first bit of the find value is active the six MSB's of the raw divider are transferred to the output 4 to form a scaled divider without any shifting. In other words the MSB bit of find value activates the shifting elements T11, T21, T31, T41, T51 and T61 in the first column. Correspondingly, if the LSB of the find value is active the shifting elements T14, T24, T34, T44, T54 and T64 in the fourth column are activated. As a consequence, shifting of the raw divider by four bits is carried out, i.e. the fourth MSB bit and the subsequent less significant bits of the raw divider will be transferred to the output 4 as a scaled divider.

Figure 3:
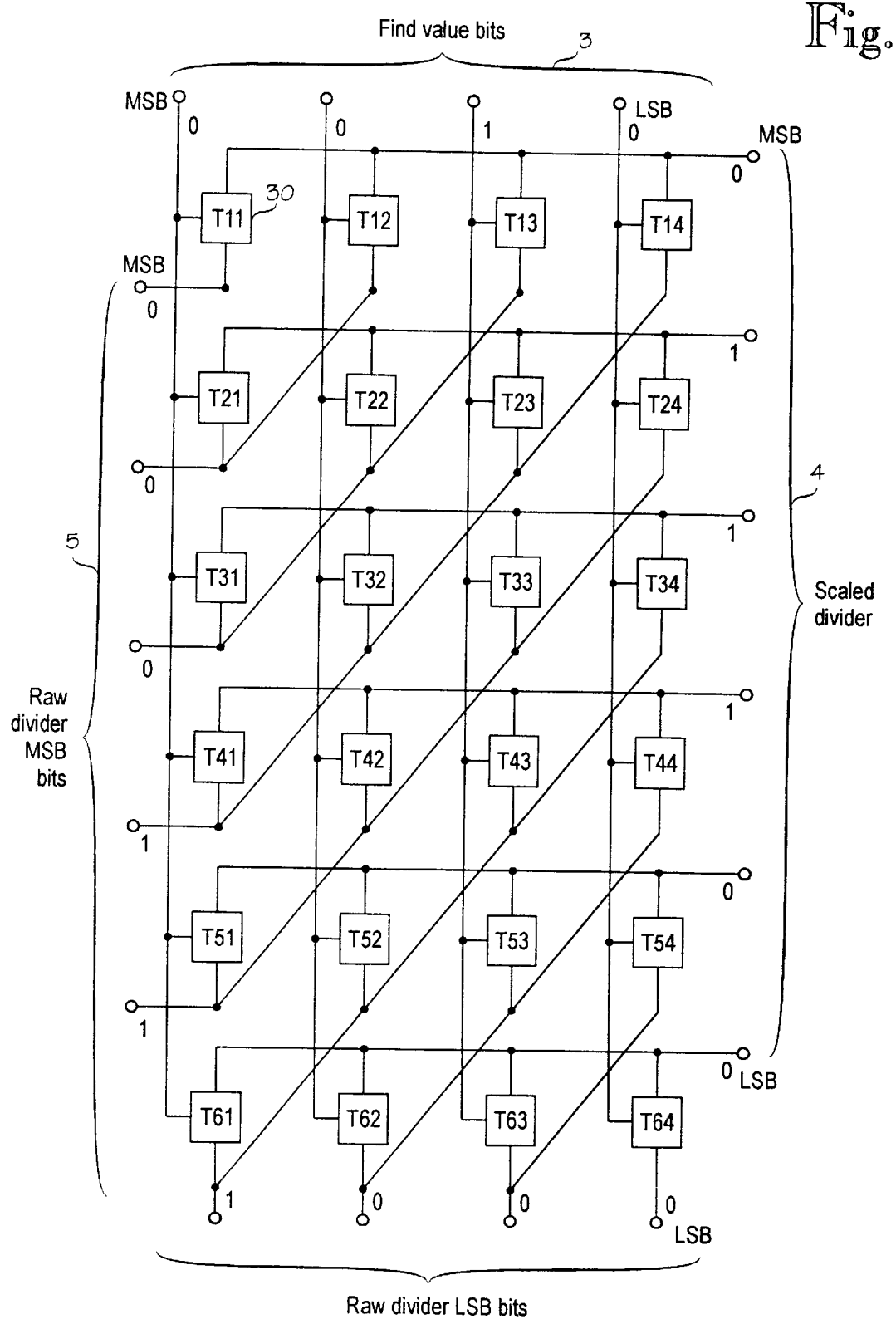
FIG. 3 shows a circuit diagram of the divider shifter block in FIG. 1.

Let us assume, as an example, that the find value is 0010, and the raw divider is 000111000, as illustrated in FIG. 3. As a consequence, elements T13, T23, T33, T43, T53 and T63 in the third column are activated, and thereby the shifting by three bits is carried out. Thus, the scaled divider at the output 4 is 011100.

Referring again to FIG. 1, the scaled N-bit divider is applied to division units $12_1$ . . . $12_M$. It should be noted that although the specific shifter unit 2 has been described for carrying out the scaling of the divider, any suitable circuit can be employed for selecting the proper bits by means of the find value provided the by finder unit 1.

As described above the find value is also applied to saturation check units 10 and shifters 11 for scaling the dividend (s). Another input to the saturation check unit 10 is a raw dividend of L bits. In order to maintain proper value range of the dividend, the raw L-bit dividend has to be extended to have a bit width of L+N bits by adding leading zeros to the MSB side of the raw dividend. This is illustrated by extra N bits inputted to the input 7 of the saturation check unit 10. The extended (N+L)-bit raw dividend is further applied from the saturation check unit 10 to the shifter unit 11. If the saturation check unit is omitted, the inputs 7 and 6 can be applied directly to the shifter unit 11.

The function of the saturation check unit is to check whether there is a more significant active bit or active bits in the extended dividend before the bit location indicated by the find value. If such an active bit is detected, the saturation check unit will provide a saturation detected signal 13 which will cause the shifter 11 to set the scaled dividend to the maximum value thereof, i.e. each bit is set active. Saturation check unit 10 may be omitted, when the raw dividend and the raw divider are well defined so that no saturation can occur.

Figure 4A:
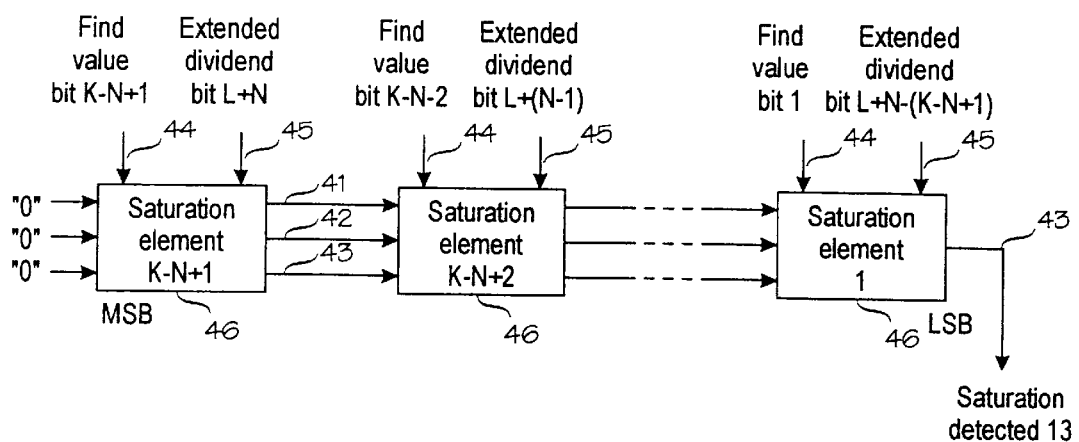
FIG. 4A shows a block diagram of the saturation check block in FIG. 1.
Figure 4B:
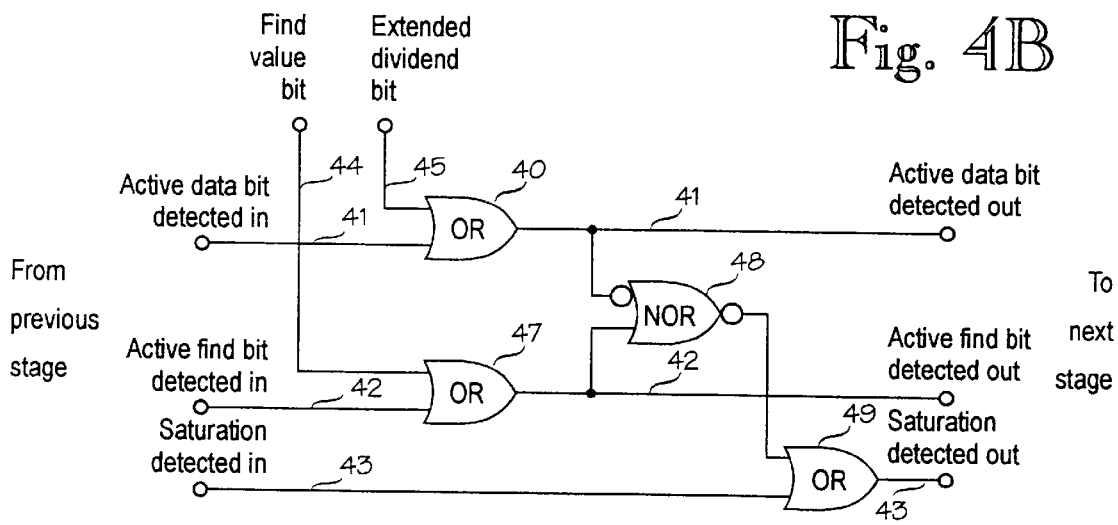
FIG. 4B shows a circuit diagram of the saturation element of FIG. 4A.

The structure and operation of the saturation check unit 10 will be described with reference to FIGS. 4A and 4B. The saturation check unit consists of a cascade connection of saturation elements 46, the total number of saturation elements being (K−N+1). The structure of saturation element 46 is shown in FIG. 4B. The inputs to the saturation element 46 are find value bit 44 and extended dividend bit 45, as well as "active data bit detected in", "active find bit detected in" and "saturation detected in" signals on lines 41, 42 and 43, respectively, from the previous stage. The outputs from the element 46 are "active data bit detected out", "active find bit detected out" and "saturation detected out" signals on lines 41, 42 and 43, respectively, to the next saturation element 46. In the first element 46 the input lines 41, 42 and 43 are set to be zero, as shown in FIG. 4A. The OR gate 40 examines whether the extended dividend bit to be checked or the line 41 from the previous stage is active "1". If one or both of the inputs 41 and 45 are active, the active data bit detected out signal on line 41 is set active, and consequently, this information will be transferred through the cascade. If both inputs to the OR gate are inactive, also the output of the OR gate 40 is inactive. An OR gate 47 examines whether the current find value bit on line 44 is active or the active find bit detected in signal on the line 42 from the previous stage inactive. If one or both of the input to the OR gate 47 is active, the OR gate 47 will set the active find bit detected out signal on line 42 active. A NOR gate 48 receives the output of the OR gate 40 to an inverting input and the output of the OR gate 47 to a non-inverting input. The function of the NOR gate 48 is to check whether there is an active data bit in the extended dividend before an active find value bit exists. In other words, if output of the OR gate 40 is active and the output of the OR gate 47 is inactive, the output of the NOR gate 48 is set active to indicate that the saturation is detected. The output of NOR gate 48 is connected to an input of an OR gate 49. Another input to the NOR gate 49 is the saturation detected in signal on line 43 from the previous saturation element 46. The out put of the OR gate 49 provides an saturation detected out signal on line 43 to the next stage. The saturation detected out signal is active, if one or both of the inputs of the OR gate 49 is active. As a consequence, the indication of the detected saturation will be transferred through the cascade and outputted from the last saturation element 46 as a saturation detected signal 13 to the shifter 11.

Figure 5:
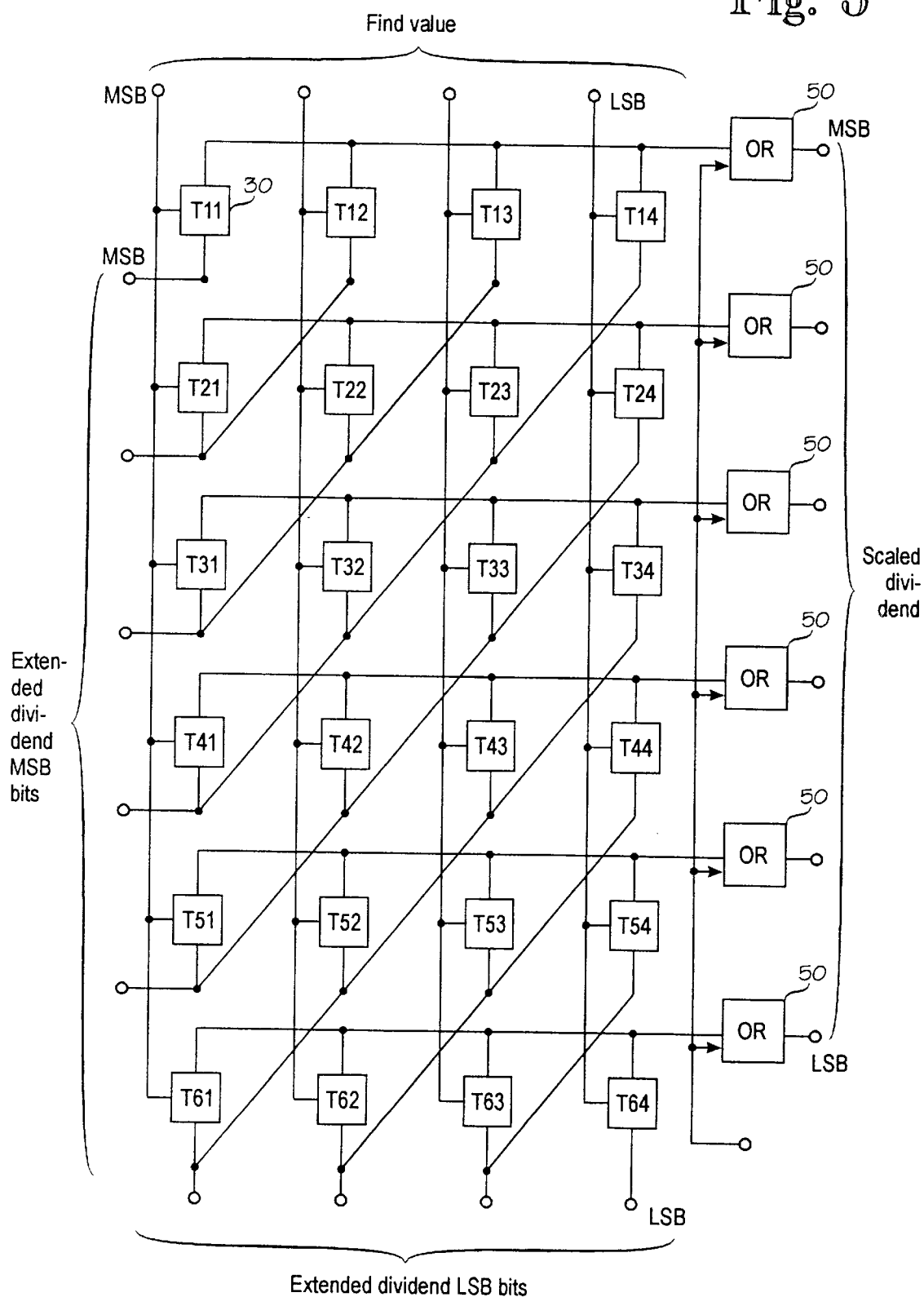
FIG. 5 shows a circuit diagram of the dividend shifter block of FIG. 1.

Referring again to FIG. 1, the shifter unit 11 receives the find value, the extended raw dividend of N+L bits, and the saturation detected signal, and provides a scaled dividend of 2N bits to the division unit 12. The detailed structure of shifter unit 11 is shown in FIG. 5. The shifter unit is based on a shifting cell array structure similar to that shown in FIG. 3. The extended dividend is applied to the data inputs of the shifting cells 30, and the find value bits are applied to the control inputs of the cells 30. The operation of the array is similar to that explained with reference to FIG. 3. However, in FIG. 5 OR gates 50 are provided at the output of the array in order to provide to saturation function according to the invention. More particularly, each scaled dividend bit from the array is connected to the input of the respective OR gate 50. The saturation detected signal from the saturation check unit 10 is applied to another input of each OR gates 50. If a saturation detected input is inactive, the outputs of the OR gates 50 follow the bits outputted from the array. However, if the saturation detected input is active, outputs of the OR gates 50 are set active, i.e. to the maximum value of the scaled dividend.

Referring again to FIG. 1, the division unit 12 may be of any conventional design which provides a division of an 2N-bit dividend by a N-bit divider for obtaining a N-bit division result. As noted above, the present invention is particularly applicable for processing two dimensional information by a perspective information of a pixel in a three-dimensional graphics. In that case, the raw divider is the perspective information of the pixel, and the raw dividend is a two-dimensional information component of the pixel, and the division result is the two-dimensional information processed by the perspective information of the pixel.

The drawings and the description are only intended to illustrate the present invention. In its details the present invention may vary within the scope and spirit of the attached claims.

What is claimed is:

1. An apparatus for performing a division operation, comprising a first scaling unit having a first input for a K-bit raw divider, and an output for a scaled divider having a reduced bit width a second scaling unit having a second input for a L-bit raw dividend, and an output for a scaled dividend having a reduced bit width, a division unit having first and second input for a scaled divider and a scaled dividend respectively, and an output for a N-bit division result, wherein N<K and N<L, and N, K and L being positive integers, the scaled divider being a N-bit value comprising the first active most significant bit (MSB) and N−1 subsequent less significant bits (LSB) from the raw divider, the first scaling unit further comprising an output for providing a scaling information indicating the first active MSB bit location in the raw divider, the second scaling unit being arranged to add N in active MSB-bits into the raw dividend in order to provide an extended dividend, and responsive to the scaling information for selecting the most significant bit indicated by the scaling information and 2N subsequent less significant bits from the extended dividend to provide a 2N-bit scaled dividend.

2. The apparatus as claimed in claim 1, wherein the scaled divider comprises the N least significant bits from the raw divider, when there are no active more significant bit before the Nth least significant bit.

3. The apparatus as claimed in claim 1 or 2, wherein the second scaling unit comprises a saturation check unit which examines whether there is an active more significant bit before the bit indicated by the scaling information, and controls the second scaling unit to saturate the outputted scaled dividend to the maximum value thereof, if a more significant active bit is found.

4. The apparatus according to claim 1, wherein the dividend comprises two dimensional information of a pixel in a three dimensional graphics, and the divider comprises a perspective information of the pixel.

5. The apparatus according to claim 4, wherein each pixel comprises at least two separate two-dimensional information components having a same perspective information, and the apparatus comprises a dedicated second scaling unit and a dedicated division unit for each two-dimensional information component, and a single first scaling unit for providing the scaled dividend derived from the perspective information to all division units and for providing the scaling information for each second scaling unit.

6. An apparatus for performing a division operation, comprising a first scaling unit for deriving a scaled divider from a K-bit raw dividend, a second scaling unit for deriving a scaled divider from a L-bit raw dividend, a division unit for dividing the scaled dividend by the scaled divider to achieve a N-bit result of the division operation, wherein N<K and N<L, N, K and L being positive integers, the first scaling unit being arranged to find a first active most significant bit in the raw divider, and to select the found first active bit and N−1 subsequent less significant bits to form the scaled divider, the first scaling unit further being arranged to provide scaling information indicating the first active bit location in the raw divider, the second scaling unit being arranged to add N inactive most significant bits to the raw dividend in order to provide an extended dividend, and responsive to a scaling information for selecting the most significant bit indicated by the scaling information and 2N subsequent less significant bits from the extended dividend to form the 2N-bit scaled dividend.

7. The apparatus according to claim 6, wherein the first scaling unit is arranged to examine whether there is an active bit before the Nth least significant bit in the raw divider, and to select the N least significant bits of the raw divider to form the scaled divider, when there are no active bit before the Nth least significant bit in the raw divider.

8. The apparatus according to claim 6 or 7, wherein the second scaling unit comprises a saturation check unit for checking whether there is an active more significant bit before the bit indicated by the scaling information in the raw dividend, and for controlling the second scaling unit to saturate the scaled dividend to the maximum value, when a more significant active bit is found.

9. The apparatus according to claim 6, wherein the dividend comprises two-dimensional information of a pixel in three-dimensional graphics, and the divider comprises a perspective information of the pixel.

10. The apparatus according to claim 9, wherein each pixel comprises at least two separate two-dimensional information components having the same perspective information, and the apparatus comprises a dedicated second scaling unit and a dedicated division unit for each two-dimensional information components, and a single first scaling unit for deriving the scaled divider from the perspective information to each division units and the scaling information for each second scaling unit.

11. A method for processing two-dimensional information by a perspective information of the pixel in a three-dimensional graphics, comprising steps of searching the first active most significant bit in a K-bit raw perspective information of a pixel, providing a scaling information indicating a first active most significant bit location in the raw perspective information, selecting the found first active most significant bit and N−1 subsequent less significant bits as a scaled perspective information, adding N inactive most significant bits to the L-bit two-dimensional information of the pixel in order to provide an extended two-dimensional information, selecting the most significant bit indicated by the scaling information and 2N−1 subsequent least significant bits form the extended two-dimensional information as a scaled two-dimensional information, providing the 2N-bit scaled two-dimensional information by the N-bit scaled perspective information in order to provide N-bit result which represent the two-dimensional information processed by perspective information of the pixel, wherein $N<K$ and $N<L$, N, K and L being positive integers.

12. The method according to claim 11, comprising steps of checking whether there is an active more significant bit before the Nth least significant bit in the raw perspective information, and selecting the N least significant bits of the raw perspective information as the scaled perspective information, when there are no active bit before the Nth least significant bit in the raw perspective information.

13. The method according to claim 11 or 12, comprising steps of checking whether there is an active more significant bit before a bit location indicated by the scaling information in the two-dimensional information, and saturating the scaled two-dimensional information to the maximum value, when a more significant active bit is found.

14. The method according to claim 11, comprising a step of utilizing a single scaled perspective information and a single scaling information first scaling and processing several separate two-dimensional information components of the pixel.

* * * * *